(12) United States Patent
Kawachi et al.

(10) Patent No.: US 6,690,981 B1
(45) Date of Patent: Feb. 10, 2004

(54) SYSTEM AND METHOD FOR ENCAPSULATING USER INTERFACE CODE FOR A GRAPHICAL PROGRAM

(75) Inventors: Yumiko Kawachi, Austin, TX (US); Robert Dye, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/565,610

(22) Filed: May 4, 2000

(51) Int. Cl.[7] .............................................. G05B 15/00
(52) U.S. Cl. .............................. 700/83; 700/86; 700/87; 717/1; 717/2; 717/10; 717/109; 717/167; 717/113; 345/700; 345/701; 345/702; 345/853; 345/854; 345/855; 345/961; 345/965; 345/734; 345/735; 345/762
(58) Field of Search ........................... 717/1, 2, 10, 109, 717/167, 113, 114; 345/701, 702, 967, 334, 348, 349, 700, 853, 854, 855, 961, 965, 734, 735, 762; 700/83, 86, 87

(56) References Cited

U.S. PATENT DOCUMENTS

| 5,261,043 A | * | 11/1993 | Wolber et al. | 345/809 |
|---|---|---|---|---|
| 5,301,336 A | | 4/1994 | Kodosky et al. | |
| 5,313,575 A | * | 5/1994 | Beethe | 345/763 |
| 5,325,481 A | * | 6/1994 | Hunt | 345/809 |
| 5,481,741 A | | 1/1996 | McKaskle et al. | |
| 5,760,788 A | * | 6/1998 | Chainini et al. | 345/474 |
| 6,053,951 A | * | 4/2000 | McDonald et al. | 717/109 |
| 6,064,812 A | | 5/2000 | Parthasarathy et al. | |

* cited by examiner

Primary Examiner—Anil Khatri
Assistant Examiner—Thomas Pham
(74) Attorney, Agent, or Firm—Meyertons Hood Kivlin Kowert & Goetzel, P.C.; Jeffrey C. Hood; Jason L. Burgess

(57) ABSTRACT

System and method for enabling user interface code to be encapsulated in a sub-program of a graphical program. A node referencing a user interface element of a graphical program may be connected to a node referred to as a "property node". The user may configure the property node with information specifying which property or set of properties of the referenced user interface element to set or retrieve. When executed, the property node may utilize the reference provided by the node associated with the user interface element in order to interact with the element. The node referencing the user interface element may also be connected to a subprogram node. The subprogram is operable to receive the user interface element reference and pass the reference to property nodes in order to set or retrieve properties of the user interface element. The subprogram may have an associated user interface panel comprising a "reference control" for receiving a user interface element reference. Type information relating to the user interface element reference passed to the subprogram may be specified.

27 Claims, 14 Drawing Sheets

SYSTEM AND METHOD FOR ENCAPSULATING USER INTERFACE CODE FOR A GRAPHICAL PROGRAM

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

1. Field of the Invention

The present invention relates to the field of graphical programming, and in particular to a system and method for interacting with user interface elements associated with a graphical program, e.g., to set or retrieve various properties of the user interface elements.

2. Description of the Related Art

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers or interpreters. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a compuert system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, industrial automation, and simulation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered the highest and most intuitive way in which to interact with a computer. A graphically based programing environment can be represented at a level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, data structures are automatically constructed which characterize an execution procedure which corresponds to the displayed procedure. The graphical program may be compiled or interpreted by a computer. Therefore, a user can create a computer program solely by using a graphically based programming environment. This graphically based programming environment may be used for creating virtual instrumentation systems, industrial automation systems, modeling processes, and simulation, as well as for any type of general programming.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, and machine vision applications, among others. A primary goal of graphical programming, including virtual instrumentation, is to provide the user the maximum amount of flexibility to create his/her own applications and/or define his/her own instrument functionality.

When creating a graphical program, a user may place or manipulate icons in a block diagram using a block diagram editor to create a data flow "program." A graphical program for controlling or modeling devices, such as instruments, processes or industrial automation hardware, may be referred to as a virtual instrument (VI). In creating a virtual instrument, a user may create a front panel or user interface panel. The front panel may include various user interface elements or front panel objects, such as controls of indicators, that represent or display the respective input and output that will be used by the graphical program or VI, and may include other icons which represent devices being controlled.

The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects may be embedded in the block diagram.

During creation of the graphical program, the user may select various function nodes or icons that accomplish his desired result and connect the function nodes together. For example, the function nodes may be connected in a data flow or control flow format. The function nodes may be connected between the terminals of the respective controls and indicators. Thus the user may create or assemble a data flow program, referred to as a block diagram, representing the graphical data flow which accomplishes his desired process. The assembled graphical program may then be compiled or interpreted to produce machine language that accomplishes the desired method or process as shown in the block diagram.

A user may input data to a virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, and the input may not be interactively manipulable by the user during program execution.

FIG. 1 illustrates an exemplary front panel or user interface panel. The panel includes various user interface elements for providing input to a graphical program and viewing output from the graphical program such as described above. For example, FIG. 1 illustrates a standard push button, labeled "OFF". Other types of standard user interface elements that may be included on a front panel or user interface panel include text fields, list boxes, selection controls, menu bars, tool bars, etc.

In addition to such standard types of user interface elements, a graphical programming environment may also provide other types of specialized user interface elements, e.g., user interface controls that are directed toward instrumentation or measurement applications. For example, FIG. I illustrates several user interface controls resembling knobs such as are found on hardware instruments. FIG. 2 illustrates additional examples of user interface elements useful for instrumentation applications, e.g., a thermometer control, an LED control, a meter control, a waveform graph control, a tank control, etc.

In addition to user interface controls for providing input to or displaying output from a graphical program, a front panel or user interface panel may also include other types of user interface elements, such as elements for simply affecting the appearance of the graphical user interface, e.g., text labels or graphics images.

During execution of a graphical program, it is often necessary or desirable to dynamically alter a user interface, e.g., to reflect the current state of the program. For example, it may be necessary to change various properties or settings of a user interface element, for example to dim or hide a user interface element that is currently inapplicable, change the size or position of a user interface element, change the data value associated with a user interface element, change the color of a user interface element, e.g., to reflect an error state, etc. In addition to changing user interface properties or settings, it may also be necessary to retrieve various properties of user interface elements.

One approach that has been taken in the prior art to setting and retrieving such user interface element properties is the use of "attribute nodes". An attribute node is a node included in the block diagram portion of a graphical program, wherein the node is associated with a particular user interface element. For example, a user may create an attribute node for a user interface element by selecting the user interface element on the user interface panel and issuing a command to create an attribute node for the element, e.g., by selecting an item from a menu or pop-up menu. The user may then configure the block diagram attribute node to set or retrieve the particular user interface element property of interest. U.S. Pat. No. 5,481,741 discloses the use of attribute nodes in a graphical program.

FIG. 3 illustrates two examples of an attribute node, which normally appears in the graphical program block diagram, and the user interface element it affects, which may also appear in the block diagram or in a separate front panel. The attribute node of FIG. 3 sets a "Disabled" property of a user interface element. As shown, when a value of "1" is wired to the attribute node, the attribute node has the effect of enabling the associated user interface element when the node is executed. When a value of "2" is wired to the attribute node, the attribute node has the effect of disabling or dimming the associated user interface element. FIG. 4 illustrates an exemplary graphical program that uses attribute nodes.

One drawback of using a technique such as attribute nodes to interact with user interface elements is that it may be difficult to separate the user interface portion of a program from other portions of the program. Such techniques, for example, may require a node to be included on a block diagram together with other nodes affecting control or data flow of the program. A separate node may be required for each user interface element the program interacts with. In addition to possibly making the block diagram cluttered and difficult to read, this approach may also make it difficult or impossible to encapsulate the user interface logic for a program in a separate portion of the program, e.g., as a graphical sub-program. Thus, it may be desirable to provide an improved system and method for interacting with user interface elements, which may promote such well-known programming principles as code modularization and code re-use.

SUMMARY OF THE INVENTION

The problems outlined above may in large part be solved by providing a system and method for enabling user interface code to be encapsulated in a sub-program of a graphical program. For a particular user interface element that a user desires to interact with (as used herein, "interacting with" a user interface element refers to setting or retrieving a property or value associated with the user interface element) in a graphical program, the user may create a reference to the user interface element. For example, a node referencing the user interface element may be placed on the graphical diagram portion of the graphical program. This node may then be connected to a node referred to as a "property node". The user may configure the property node with information specifying which property or set of properties of the referenced user interface element to set or retrieve. When executed, the property node may utilize the reference provided by the node associated with the user interface element in order to interact with the element.

The node referencing the user interface element may also be connected to a subprogram node, wherein the subprogram node represents a subprogram which may include one or more nodes, such as property nodes. The subprogram is operable to receive the user interface element reference and pass the reference to nodes included in the subprogram, such as property nodes or other subprogram nodes, in order to set or retrieve properties of the user interface element. The subprogram may have an associated user interface panel, and a "reference control" for receiving a user interface element reference may be included on the panel.

User interface elements may be classed or typed in any of various ways. Given that certain user interface properties may only apply to particular classes or types of user interface elements, type information for a subprogram may be specified. In various embodiments, type information may be specified at various levels of granularity and in various ways. Compatibility, incompatibility, or type coercion information for a user interface element reference that is connected to a subprogram may be visually indicated.

BRIEF DESCRIPTION THE DRAWINGS

A better understanding of the present invention can be obtained when the following detailed description of the preferred embodiment is considered in conjunction with the following drawings, in which:

FIG. 13 illustrates finding the user interface element that a property node is implicitly associated with;

Figure 1:
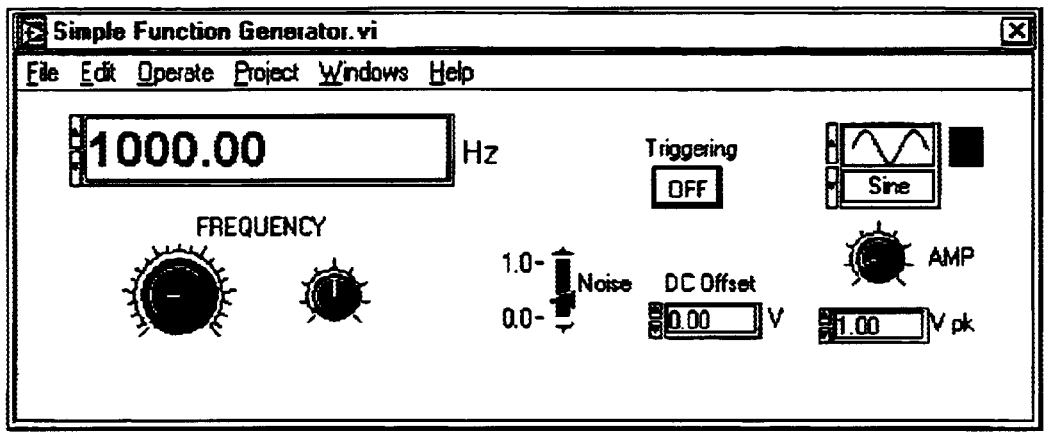
FIG. 1 illustrates an exemplary prior art front panel or user interface panel associated with a graphical program.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary the invention is to cover all modifications, equivalents and alternatives falling within the spirit and scope of the present invention as defined by the appended claims.

DETAILED DESCRIPTION OF THE PREFERRED EMBODIMENT

Incorporation by Reference

The following references are hereby incorporated by reference in their entirety as though fully and completely set forth herein:

U.S. patent application Ser. No. 09/518,492 titled "System and Method for Programmatically Creating a Graphical Program", filed Mar. 3, 2000.

U.S. patent application Ser. No. 08/810,079 titled "System and Method for Developing Automation Clients Using a Graphical Data Flow Program", filed Mar. 4, 1997.

U.S. patent application Ser. No. 08/916,005 titled "System and Method for Providing Client/Server Access to Graphical Programs", filed Aug. 21, 1997.

U.S. patent application Ser. No. 09/136,123 titled "System and Method for Accessing Object Capabilities in a Graphical Program", filed Aug. 18, 1998.

U.S. Patent No. 5,481,741 titled "Method and Apparatus for Providing Attribute Nodes in a Graphical Data Flow Environment", issued Jan. 2, 1996.

Figure 5A:
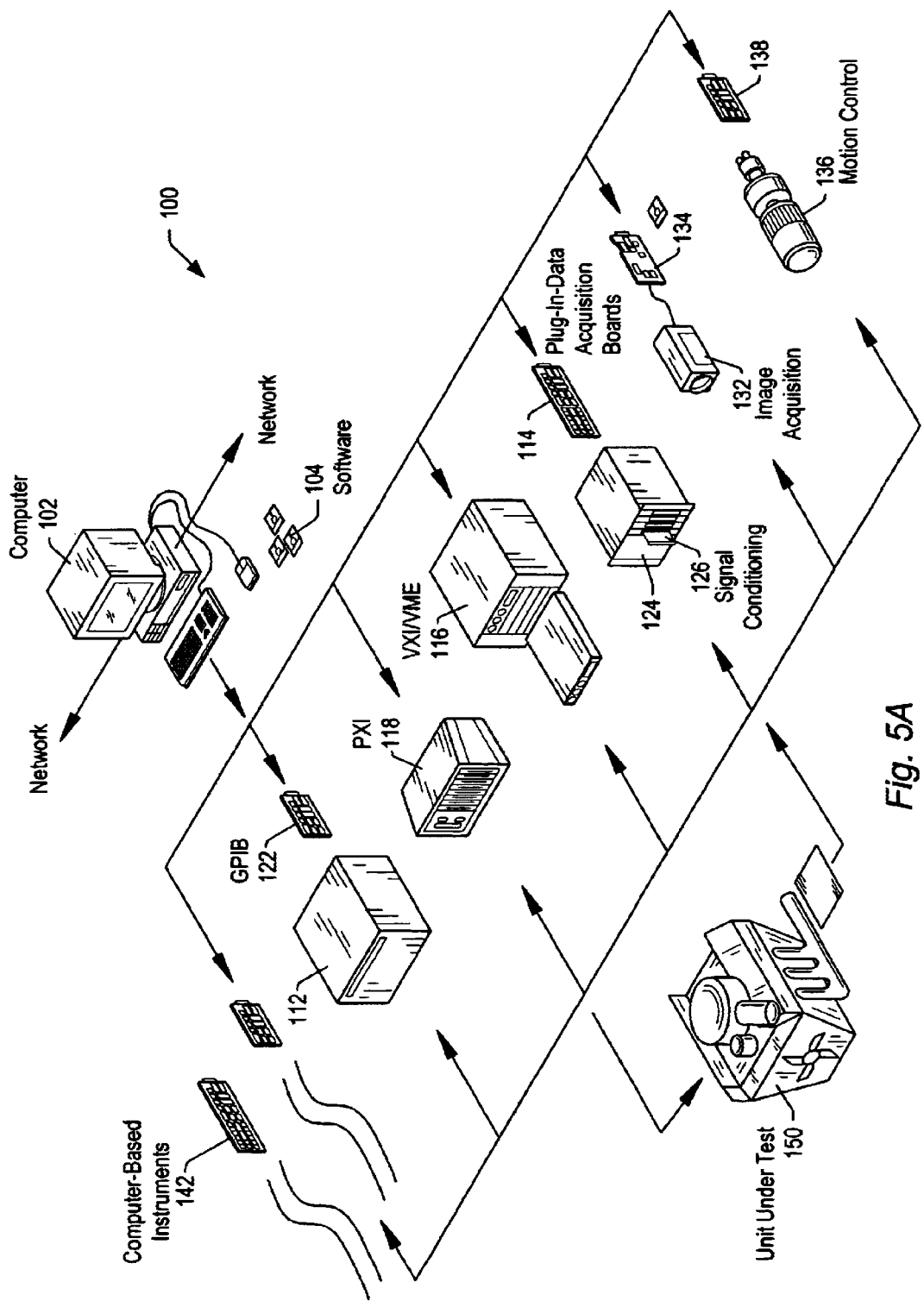
FIGS. 5A and 5B illustrate representative instrumentation and process control systems including various I/O interface options.
Figure 5B:
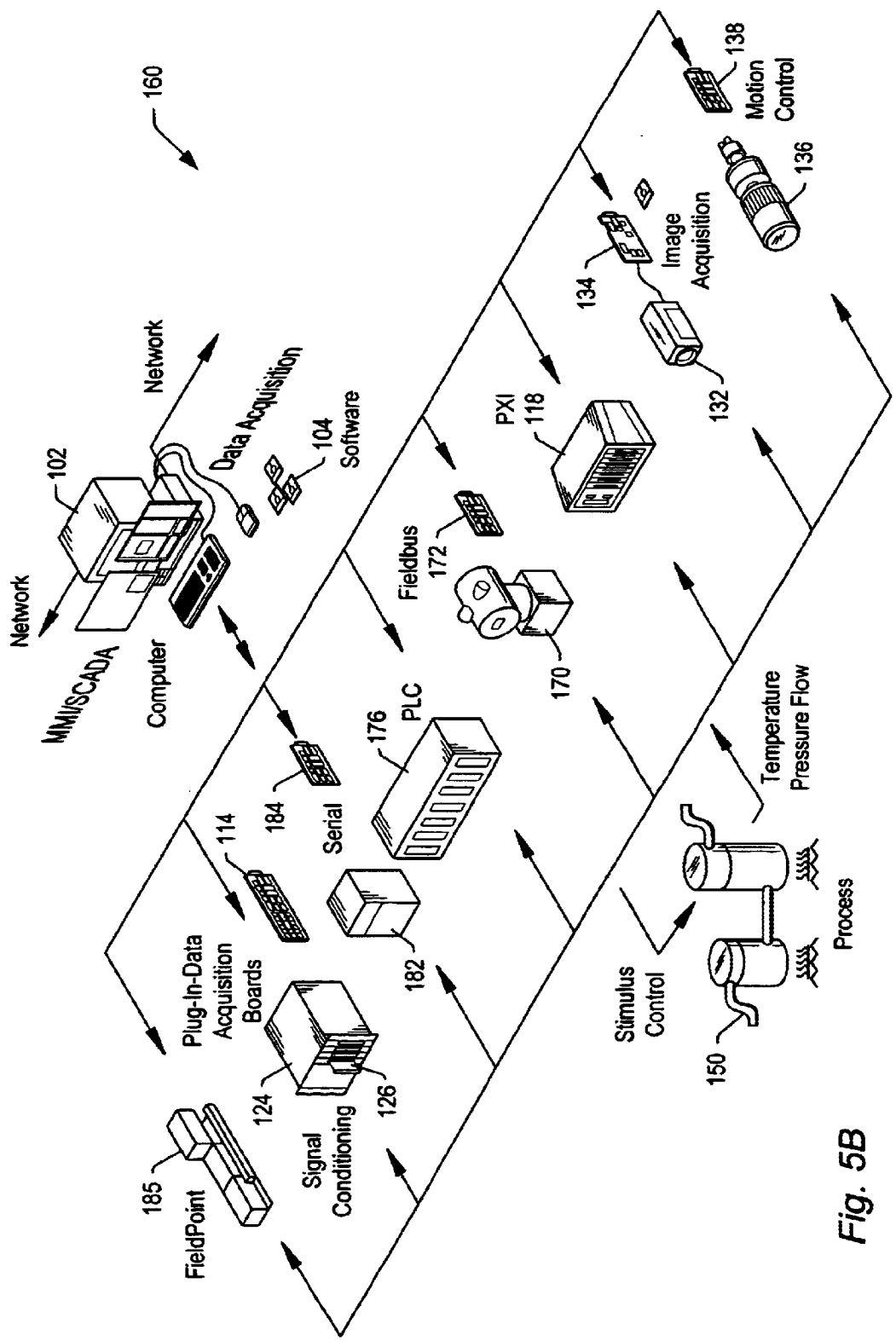

FIGS. 5A and 5B—Instrumentation and Industrial Automation Systems

FIGS. 5A and 5B illustrate exemplary systems which may store or execute graphical programs for instrumentation, process control, or other purposes. These programs may of course be stored in or used by other types of systems as desired. Thus, the present invention may be used in any of various types of systems, and FIGS. 5A and 5B are exemplary only.

FIG. 5A illustrates an instrumentation control system 100. The system 100 comprises a host computer 102 which connects to one or more instruments. The host computer 102 comprises a CPU, a display screen, memory, and one or more input devices such as a mouse or keyboard, as shown. The host computer 102 connects through the one or more instruments to analyze, measure, or control a unit under test (UUT) or process 150.

The host computer 102 may execute a graphical program which interacts with or controls the one or more instruments. The graphical program may comprise a user interface, and the graphical program may interact with various user interface elements, e.g., to set or retrieve data values associated with the user interface elements, to set or retrieve various user interface properties related to the user interface elements, etc. Graphical program code that performs this type of interaction with user interface elements is referred to herein as "user interface code". As described below, at least a portion of the user interface code may be encapsulated as a sub-program.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Ser. bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 5B illustrates an exemplary industrial automation system 160. The industrial automation system 160 is similar to the instrumentation or test and measurement system 100 shown in FIG. 5A. Elements which are similar or identical to elements in FIG. 5A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition portable or distributed data acquisition, process control, advanced analysis, or other control. In FIG. 5B, the computer 102 may execute a graphical program that is involved with the automation function performed by the automation system 160. Similarly as described above with reference to FIG. 5A, the graphical program may be constructed in such a way as to call user interface code that is encapsulated as a sub-program.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 5A and 5B, the computer system 102 preferably includes a memory medium on which one or more computer programs or software components according to the present invention are stored. The term "memory medium" is intended to include an installation medium, e.g., a CD-ROM, floppy disks 104,- or tape device, a computer system memory or random access memory such as DRAM, SRAM, EDO RAM, RRAM, etc., or a non-volatile memory such as a magnetic media, e.g., a hard drive, or optical storage. The memory medium may comprise other types of memory as well, or combinations thereof.

In addition, the memory medium may be located in a first computer in which the programs are stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, a graphical program that is constructed as described herein may be designed for data acquisition/generation, analysis, and/or display, and for controlling or modeling instrumentation or industrial automation hardware. For example, in one embodiment, the graphical program may be created using the National Instruments LabVIEW graphical programming environment application, which provides specialized support for developers of instrumentation and industrial automation applications. However, it is noted that the present invention can be used for a plethora of applications and is not limited to instrumentation or industrial automation applications. In other words, FIGS. 5A and 5B are exemplary only, and graphical programs for any of various purposes may be stored in and execute on any of various types of systems.

Figure 6:
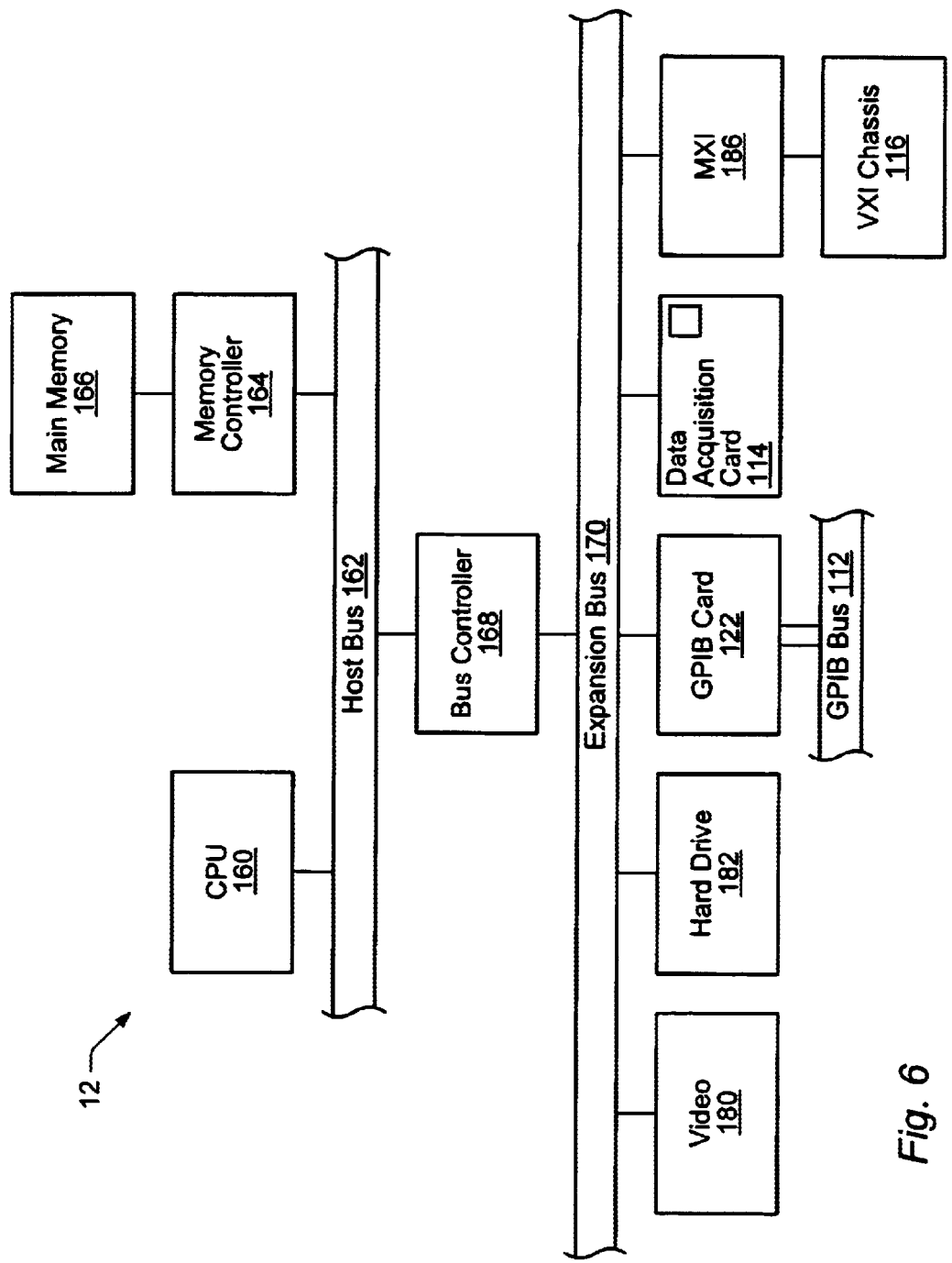
FIG. 6 is a block diagram of the computer system of FIGS. 5A and 5B.

FIG. 6—Computer System Block Diagram

FIG. 6 is an exemplary block diagram of the computer system illustrated in FIGS. 5A and 5B. It is noted that any type of computer system configuration or architecture can be used in conjunction with the system and method described herein, as desired, and FIG. 6 illustrates a representative PC embodiment. It is also noted that the computer system may be a general purpose computer system such as illustrated in FIGS. 5A and 5B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store one or more computer programs according to the present invention. The main memory 166 also stores operating system software as well as the software for operation of the computer system, as well known to those skilled in the art. The computer programs of the present invention are discussed in more detail below.

Figure 2:
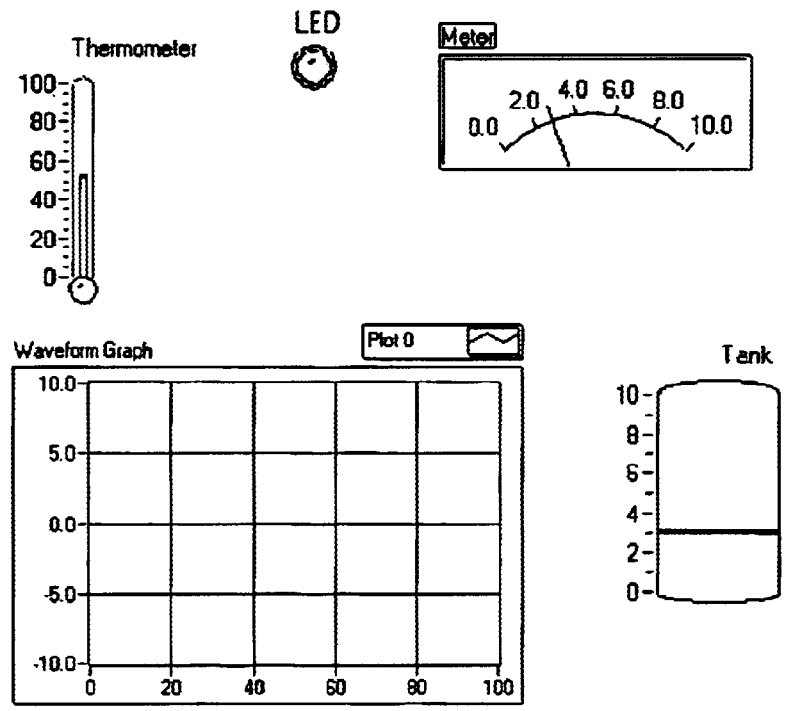
FIG. 2 illustrates additional prior art examples of user interface controls useful for instrumentation applications.
Figure 3:
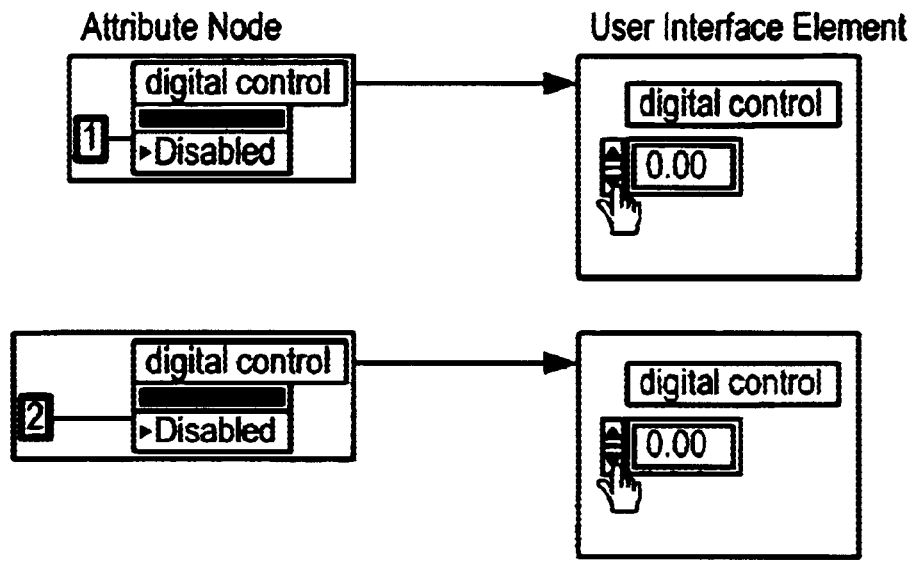
FIG. 3 illustrates an exemplary use of an attribute node according to prior art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 5A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 7A:
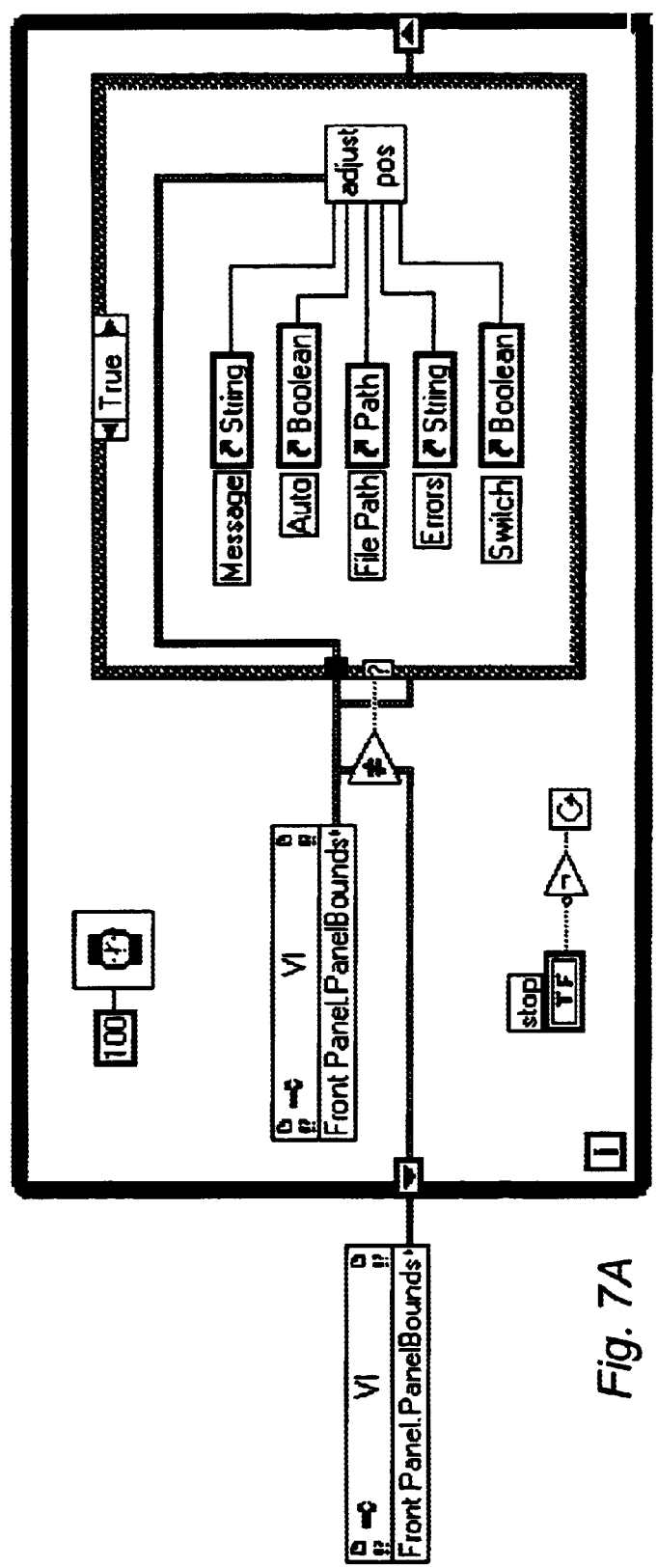
FIG. 7A illustrates an exemplary graphical program including user interface code encapsulated in a subprogram.
Figure 7B:
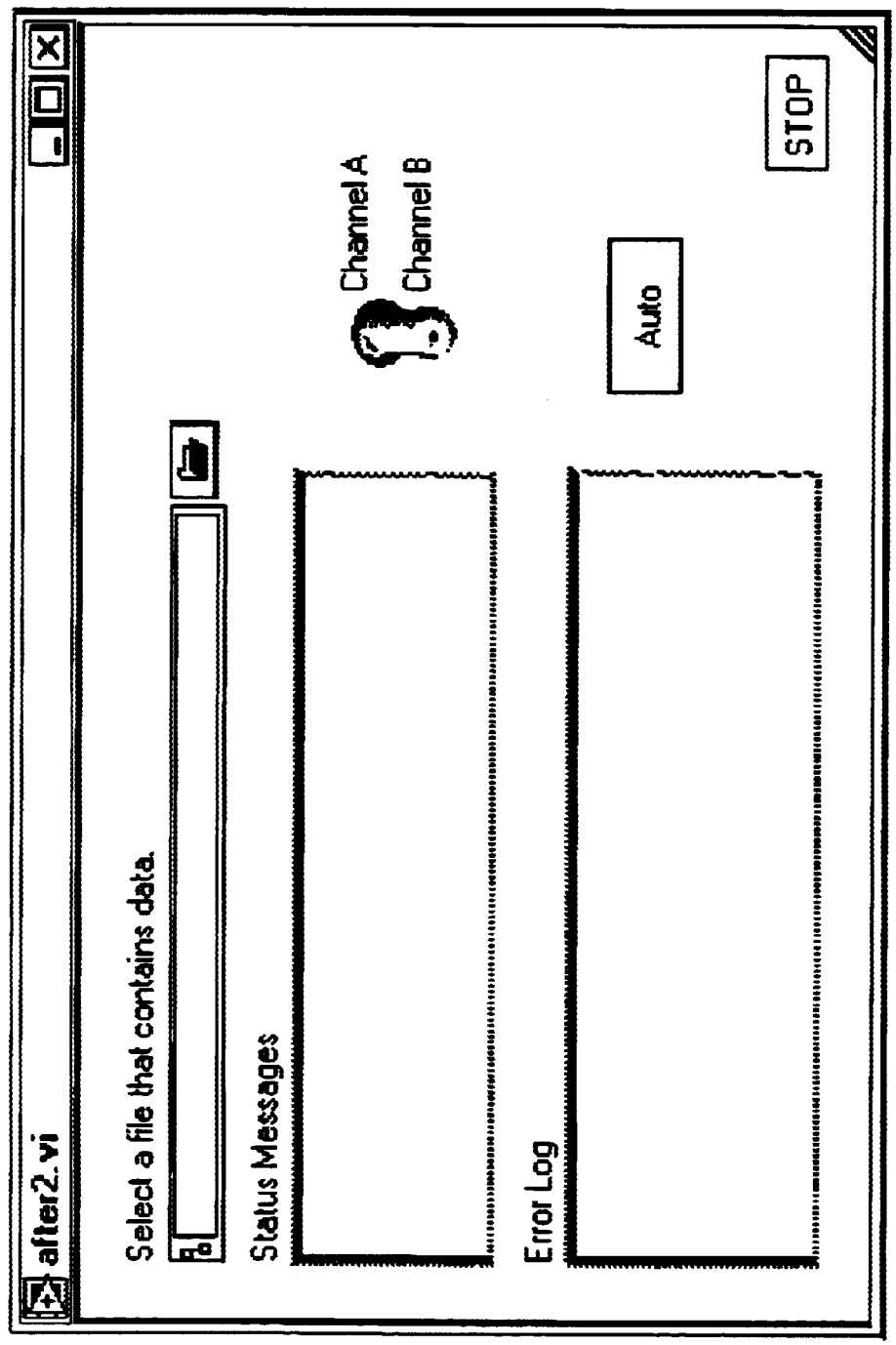
FIG. 7B illustrates a user interface panel for the graphical program of FIG. 7A.
Figure 8:
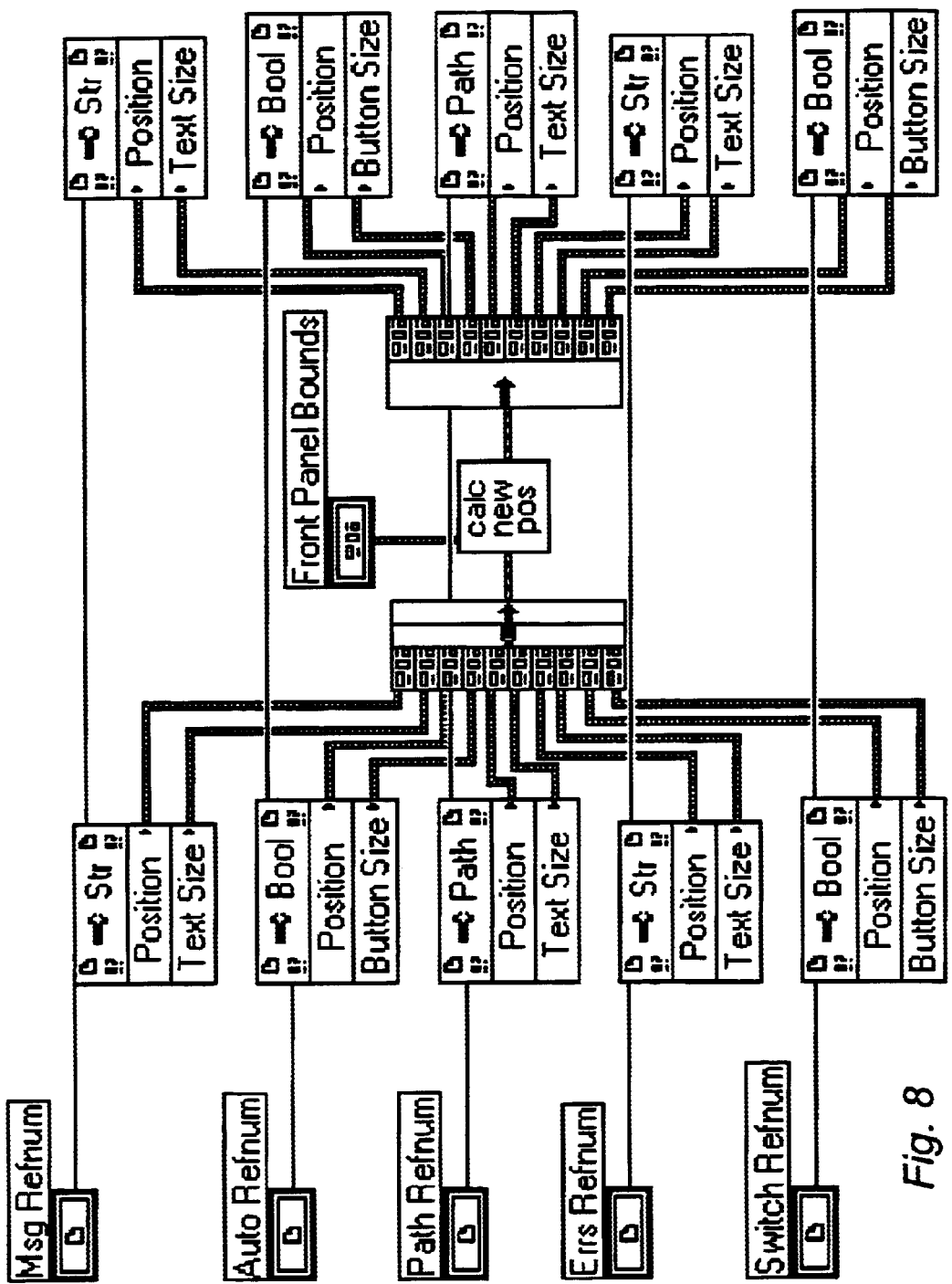
FIG. 8 illustrates the graphical subprogram called by the graphical program of FIG. 7A.

FIGS. 7–8: Graphical Program with Encapsulated User Interface Code

Figure 4:
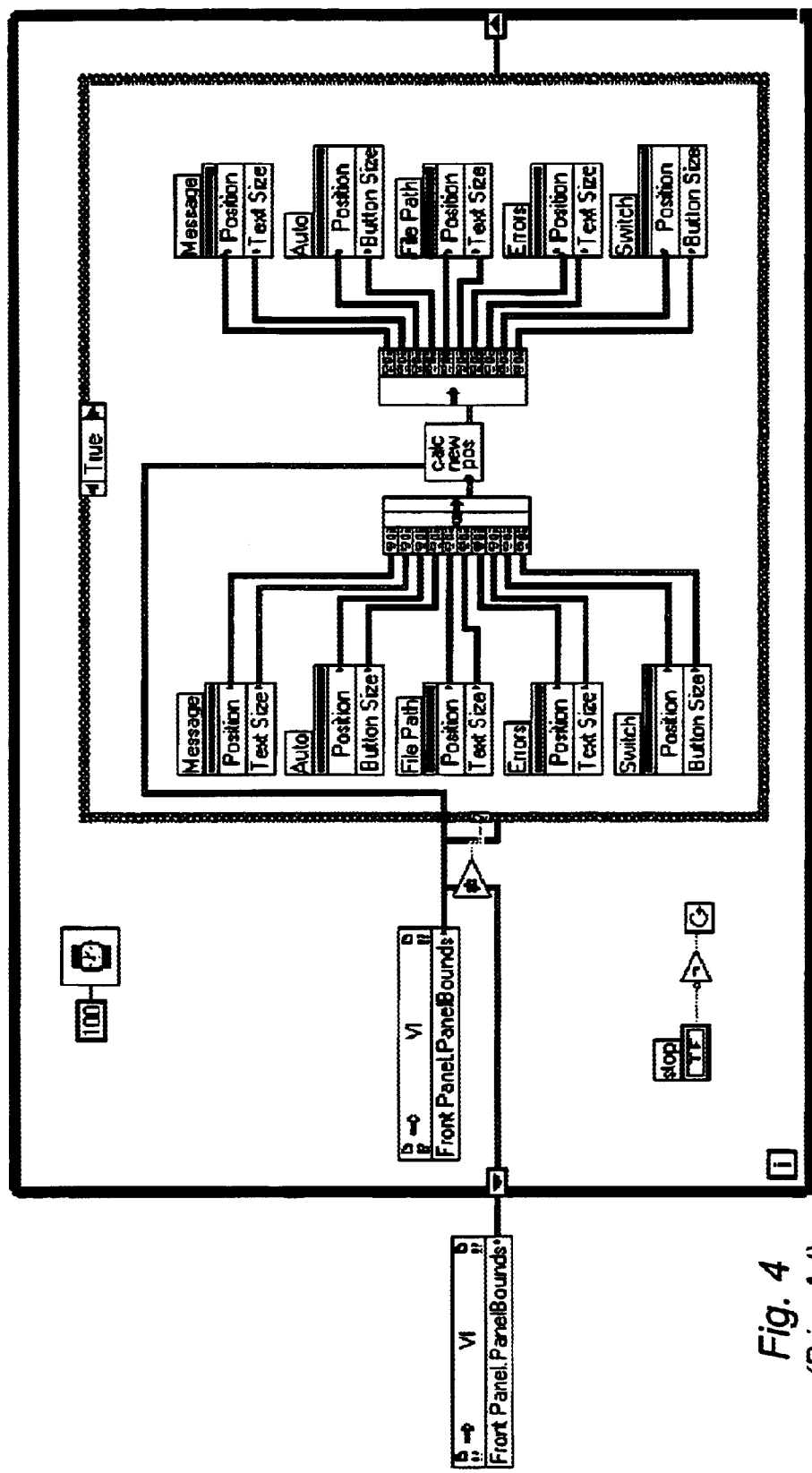
FIG. 4 illustrates an exemplary graphical program that uses attribute nodes according to prior art.

FIG. 7A illustrates an exemplary graphical program including user interface code encapsulated in a subprogram. The function of the graphical program shown in FIG. 7A is similar to the function of the prior art graphical program shown in FIG. 4. The graphical programs of FIG. 4 and FIG. 7A are both operable to resize and reposition user interface controls on a user interface panel, in response to a change in the size of the user interface panel. For example, if a user makes the user interface panel smaller, the user interface controls on the panel may automatically be scaled down in size.

As shown, the prior art graphical program of FIG. 4 utilizes attribute nodes placed in the graphical program block diagram in order to get and set the size and position for each user interface control. The program first reads the current size and position of each control, using a first set of attribute nodes. The size and position values are then passed to a subprogram which calculates new size and position values. A second set of attribute nodes then receive these new size and position values from the subprogram and set the size and position attributes for each user interface control to their respective new values.

FIG. 7A illustrates a graphical program that implements the functionality of the graphical program of FIG. 4. However, instead of retrieving and setting user interface element properties within the same graphical program diagram as the other portions of FIG. 7A, the graphical program of FIG. 7A encapsulates the user interface code in a subprogram, according to one embodiment of the invention. As shown, the increased modularity of the FIG. 7A graphical program may advantageously affect such aspects of the program as code readability, code reusability, and code maintenance.

FIG. 7B illustrates a user interface panel associated with the graphical program of FIG. 7A. As described below, the graphical program of FIG. 7A includes several "reference nodes" which provide references to various user interface controls shown in the user interface panel of FIG. 8, such as the "Status Messages" string control, the "Chanel A/B" switch control, etc. In other examples, nodes referencing any of various other types of user interface elements may be utilized, including other types of user interface controls, menu bar user interface elements, window elements, etc. It is noted that a graphical program corresponding to a user interface panel may also include terminal nodes for receiving input from user interface input controls and/or setting values of user interface output controls, although such terminal nodes are not shown in FIG. 7A and are not required.

As shown in FIG. 7A, the graphical program passes a reference to each user interface element to be resized and repositioned to a subprogram, labeled "adjust pos". For example, the program node labeled "Message" is a reference node that provides a reference to the user interface string control labeled "Status Messages" in the user interface panel shown in FIG. 7B. Creating such user interface element reference nodes and associating the nodes with particular user interface elements is discussed below. The subprogram is operable to use the user interface element references to retrieve and set user interface properties, as described below.

FIG. 8 illustrates the "adjust pos" graphical subprogram called by the graphical program of FIG. 7A. The graphical subprogram of FIG. 8 includes several nodes referred to herein as "property nodes." Property nodes may be used to set or retrieve various properties of user interface elements. A property node is not necessarily associated with a particular user interface element. Instead a "reference" to the particular user interface element or set of elements to act upon may be passed to, wired to, or associated with the property node.

For example, the FIG. 8 graphical program illustrates a node labeled "Msg Refnum", which maps to the "Message" input reference passed to the "adjust pos" subprogram in the graphical program of FIG. 7A. As shown, the output of the "Msg Refnum" node is passed to a property node, which is operable to retrieve the size and position of the referenced user interface element. The retrieved size and position values are sent to a subprogram that calculates the desired new size and position, and another property node then sets the size and position of the user interface element referenced by the "Msg Refnum" node. Similarly, property nodes retrieve and set size and position properties for the other user interface elements whose references are passed to the subprogram of FIG. 8.

It is noted that, in various embodiments, property nodes may also be operable to act on other types of elements in addition to user interface elements. For example, many software objects, e.g., objects instantiated from ActiveX™ components, Java™ classes, etc., have various properties that a program may programmatically set or retrieve. Property nodes may be operable to interact with such objects to set or retrieve properties. For more information on interacting with ActiveX™ object properties, please refer to documentation relating to ActiveX™ technology, available from Microsoft Corp. Property nodes may also be operable to act on various other types of objects associated with a graphical program. For example, U.S. patent application No. 09/518,492, incorporated herein by reference, discloses a usage of property nodes for setting properties of graphical diagram elements, such as function nodes or programmatic structures. The ability to programmatically set properties of graphical diagram elements may, for example, enable a graphical program to be programmatically created or edited.

FIGS. 9–12: Creating User Interface Element References

Figure 9:
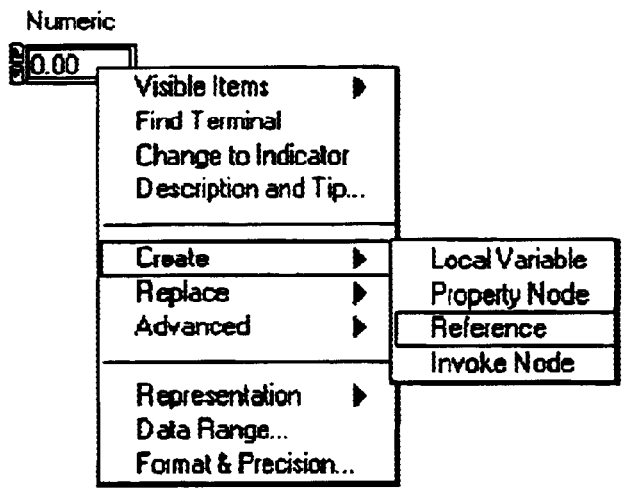
FIG. 9 illustrates creating a reference to a user interlace control.

In various embodiments, user interface element references may be created in any of various ways. In one embodiment, a user may create a reference to a user interface element from the context of the element, e.g., while editing the user interface for the graphical program. For example, to create a reference to a numeric input control, the user may select the control, e.g., by clicking on the control, and may then issue a command to create a reference to the control, e.g., by selecting a menu item from a menu or pop-up menu, as illustrated in FIG. 9. In response to the user issuing this command, a node representing the user interface element reference may be created on the graphical diagram of the graphical program. Alternatively, the user may place or create the node representing the user interface element in the block diagram and then associate the node with a particular user interface element or set of user interface elements. Other methods may also be used to create the node and/or to associate the node with a user interface element.

Figure 10:
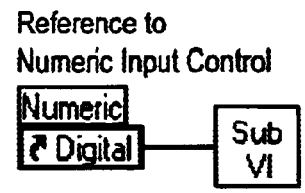
FIG. 10 illustrates a graphical diagram node referencing the user interface control of FIG. 9.

The node may be created with a label matching the label of the referenced user interface element, and the node label may be automatically updated if the user interface element label is changed. FIG. 10 illustrates a node referencing the numeric input control of FIG. 9. As shown in FIG. 10, this node, i.e., the reference to the user interface element, may then be connected to other nodes, such as a subprogram node, as described above. In another embodiment, the node which is a reference to one or more user interface elements may be created or placed directly in the subprogram. The user interface element reference may also be connected to other types of nodes in addition to subprogram nodes, such as a property node, e.g., in order to get or set a property of the user interface element in the main portion of the graphical diagram instead of in a subprogram.

Figure 11:
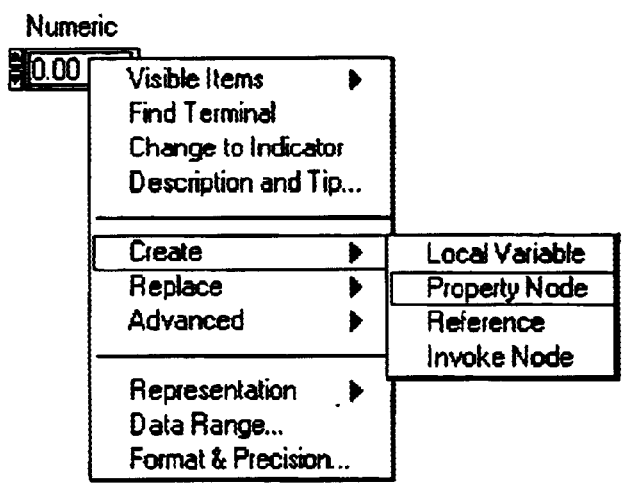
FIG. 11 illustrates creating a property node pre-configured to have an implicit reference to a particular user interface control.
Figure 12:
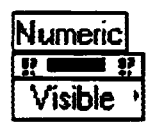
FIG. 12 illustrates a property node pre-configured with an implicit reference to a user interface control.

It is noted that it may not be necessary to explicitly create a reference to a user interface element in order to interact with the user interface element. For example, instead of selecting a menu item to create a reference to a user interface element as described above for FIG. 9, the user may instead select a menu item to create a pre-configured property node for the user interface element, as shown in FIG. 11 (menu item labeled "Property Node"). In response, a property node that is configured with an implicit reference to the user interface element may be created on the graphical diagram of the graphical program, as shown in FIG. 12. The user may then select which property of the user interface element to set or retrieve, as described below.

Figure 14:
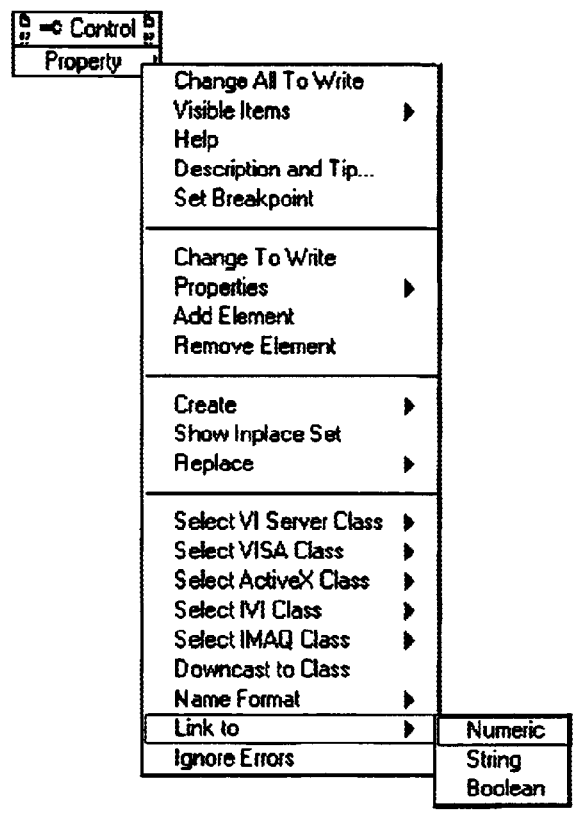
FIG. 14 illustrates associating an existing property node with a particular user interface element.

In another embodiment, a user may first create a property node and then associate the property node with a particular user interface element. For example, as shown in FIG. 14, the user may select the property node and then utilize a "Link to Control" pop-up menu item to choose the desired user interface element to link to. For example, if the user interface element labeled "Numeric" is chosen from the FIG. 14 list, then the property node may change to appear as shown in FIG. 12. In an embodiment in which the user interface elements are comprised in the block diagram (not in a separate user interface panel), the property node may be optionally wired directly to the respective user interface elements in the block diagram.

Figure 13:
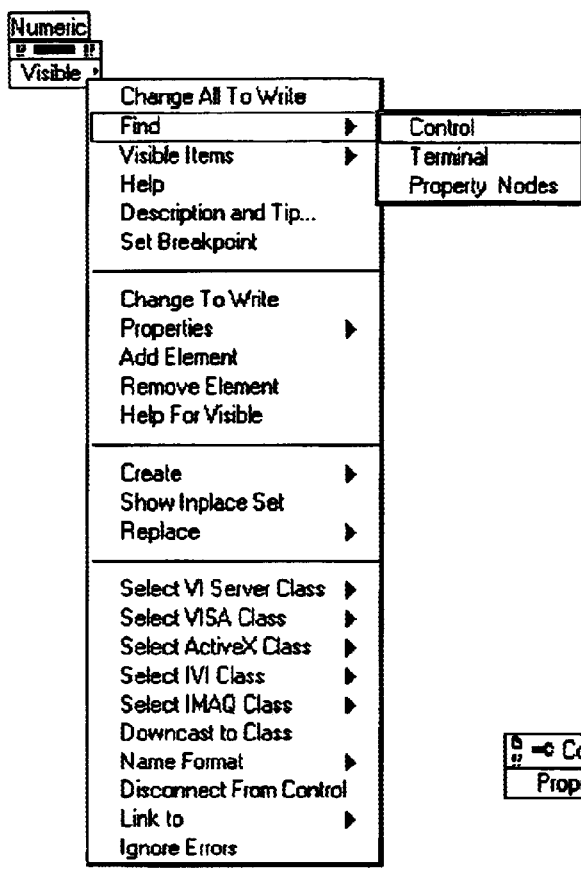

In one embodiment, the graphical programming environment may enable the user to return to or find the user interface element that a property node is implicitly associated with, e.g., by clicking on the property node and selecting a Find Control" menu item from a pop-up menu, as shown in FIG. 13. Similarly, the graphical programming environment may enable the user to select a user interface element and automatically find any graphical diagram nodes referencing the element or any property nodes implicitly associated with the element.

In one embodiment, the graphical programming environment may enable the user to drag and drop a node referencing a user interface element from the graphical diagram of a graphical program to the graphical diagram of a second graphical program. In response, a user interface element of an appropriate class and type may be created on the user interface panel of the second graphical program, and the graphical diagram node in the second graphical program may be configured to reference this user interface element.

FIGS. 15–18: Connecting a User Interface Element Reference to a Subprogram

In various embodiments of graphical programming systems, subprograms may be defined and parameters may be passed to subprograms in any of various ways. User interface element reference parameters may thus be defined for and passed to subprograms in various ways, depending on a particular embodiment. In one embodiment of a graphical programming system, each subprogram has an associated front panel, and each parameter to a subprogram has a corresponding control on the front panel. This section describes creating and configuring a user interface element reference parameter for a subprogram in such an embodiment.

Figure 15:
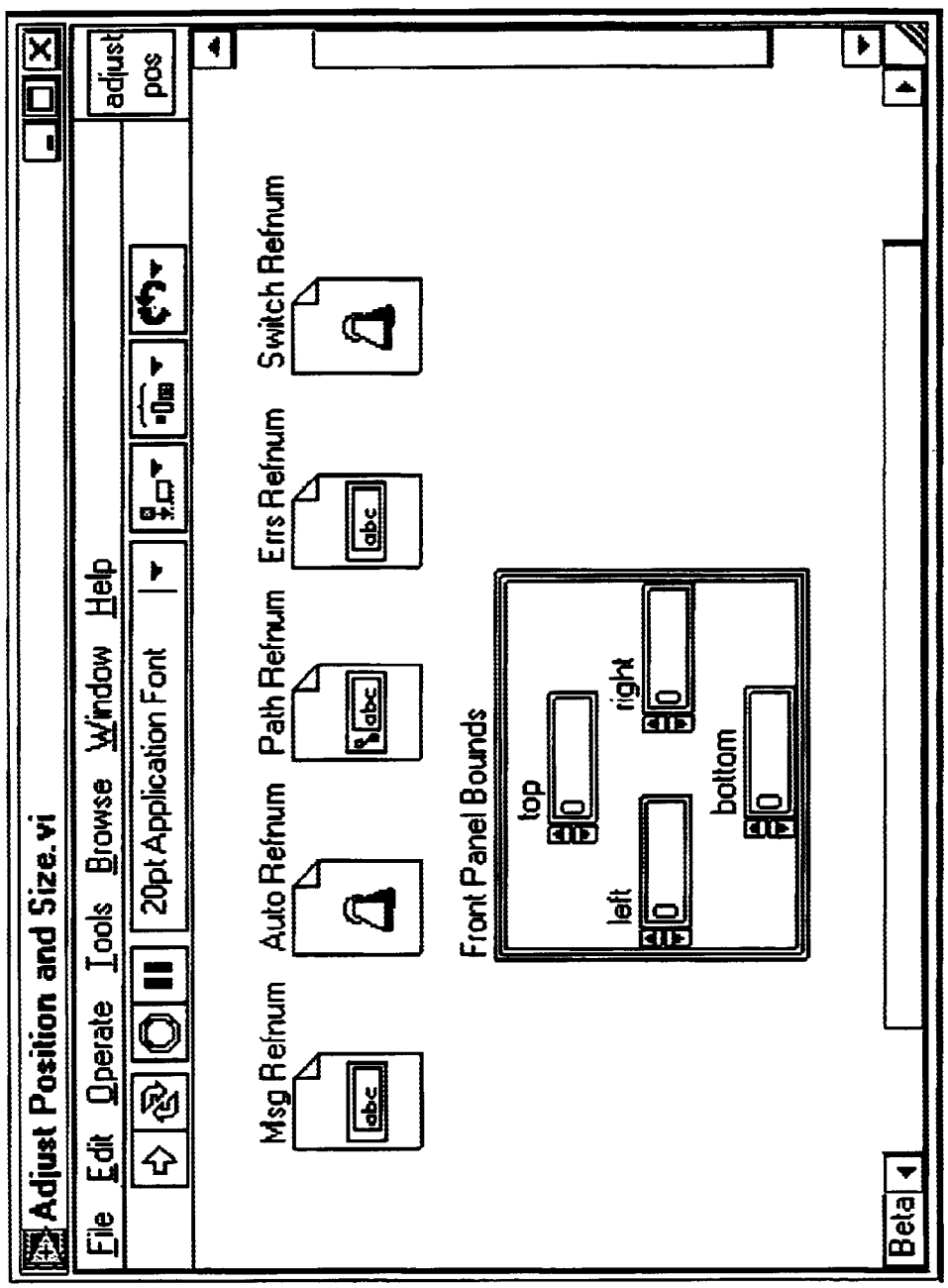
FIG. 15 illustrates a configured front panel for the graphical subprogram of FIG. 8.

To define a user interface element reference parameter for a subprogram, the user may create a "reference control" on the front panel associated with the subprogram. Such a reference control may be created in any of various ways. For example, in one embodiment a user may drag and drop a user interface element reference node from the graphical diagram to the front panel of the subprogram, and, in response, a reference control may be created. FIG. 15 illustrates a configured front panel for the graphical subprogram of FIG. 8. As shown, the front panel includes five reference controls, each corresponding to one of the user interface element references passed to the subprogram. FIG. 15 also illustrates front panel controls corresponding to the panel bound input parameters for the subprogram.

As described in more detail below, user interface element references may be typed. For example, a particular user interface element may belong to a general class of numeric input controls and may have a data type of "floating point". The reference control on the user interface panel for the subprogram may be configured to accept user interface element references of a compatible type. When a user drags and drops a user interface element reference node from the graphical diagram to the subprogram user interface panel as described above, the created reference control may automatically be configured to match the type of the reference.

Figure 16:
FIG. 16 illustrates a default reference control.
Figure 17:
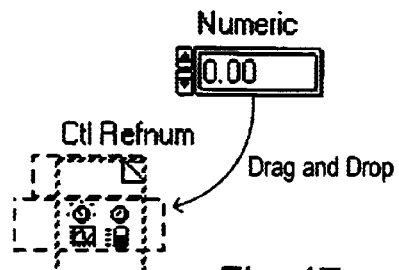
FIG. 17 illustrates dragging and dropping a user interface control to a reference control in order to configure the reference control.
Figure 18A:
FIGS. 18A and 18B illustrate configured reference controls.
Figure 18B:

In another embodiment the user may create a reference control on the user interface panel of the subprogram by selecting or dropping a reference control, e.g., via a palette or menu. When the reference control is first created, it may be configured with generic type information in order to accept user interface element references of any type. The user may then provide the reference control with specific type information if desired, e.g., by dragging a user interface element from another user interface panel and dropping the element on the reference control. For example, after dropping a reference control, the reference control may appear as shown in FIG. 16. The user may then drag and drop, for example, a numeric input control on the reference control, as shown in FIG. 17. In response, the reference control may be configured to accept references to numeric input controls, and the reference control may appear as shown in FIG. 18A. The user may optionally display the numeric input control that was dropped by using a popup menu. In this case, the reference control may then change in appearance as shown in FIG. 18B.

When a reference control is created on the subprogram user interface panel, a corresponding node may automatically be created on the graphical diagram associated with the subprogram. This node may then be connected to other nodes, e.g. property nodes or other subprogram nodes, in the subprogram graphical diagram, in order to provide these other nodes with the user interface element reference passed in to the subprogram. These other nodes may then use the user interface element reference as described above, e.g., to set or retrieve various properties of the referenced user interface element.

Figure 19:
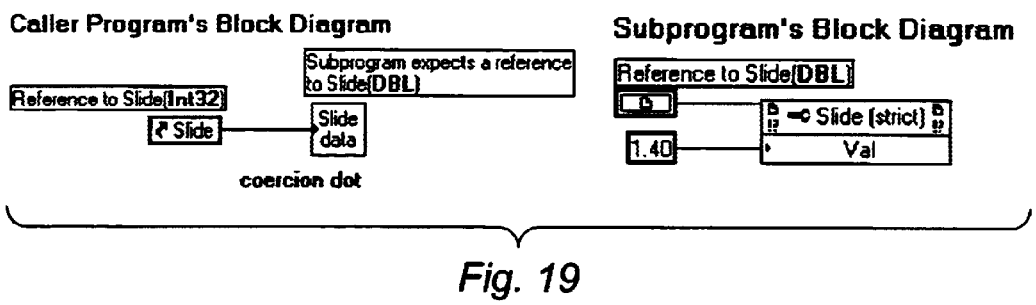
FIG. 19 illustrates visually indicating type coercion for a user interface element reference to a subprogram.
Figure 20:
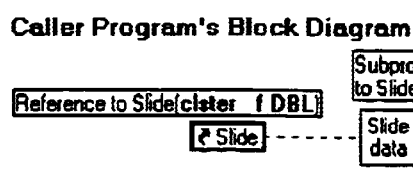
FIG. 20 illustrates visually indicating that a user interface element reference does not match the type criteria specified for a subprogram.

FIGS. 19–20: Typed User Interface Element References

As noted above, user interface element references may be typed, and subprogram user interface panel reference controls may be configured to accept references of certain types. A given user interface element may belong to a particular class and possibly one or more subclasses and/or may have an associated data type. For example, the user interface control shown in FIG. 9 may belong to a general class of controls for providing numeric input data to a program, may belong to a subclass of controls of similar or identical appearance, and may have a data type of "floating point". Another user interface control may belong to the same class and sub-class and may have an identical appearance, but may have a data type of "32-bit integer". Another user interface control may belong to the same general class of controls for providing numeric input data to a program, but may belong to a different sub-class. For example, the knob and slide controls shown on the FIG. 1 user interface panel may fit this description. These are, of course, only examples, and various embodiments of graphical programming environments may class or type user interface elements in any of various ways.

In various embodiments, a graphical programming environment may enable the user to specify class and type information for subprogram reference controls and user interface element references at different levels of granularity. For example, a reference control may be configured to only accept user interface element references that exactly match a particular class/subclass/data type criteria set. As another example, a reference control may be configured to accept references to elements of particular classes/subclasses, but may allow data type coercion. Type coercion may be visually indicated, e.g., by displaying a coercion dot at the connection point to the subprogram, as shown in FIG. 19. If a user interface element reference does not match the type criteria specified for a subprogram reference control, the incompatibility may be visually indicated, e.g., by displaying a broken or dashed connection between the reference and the subprogram, as shown in FIG. 20.

Figure 21:
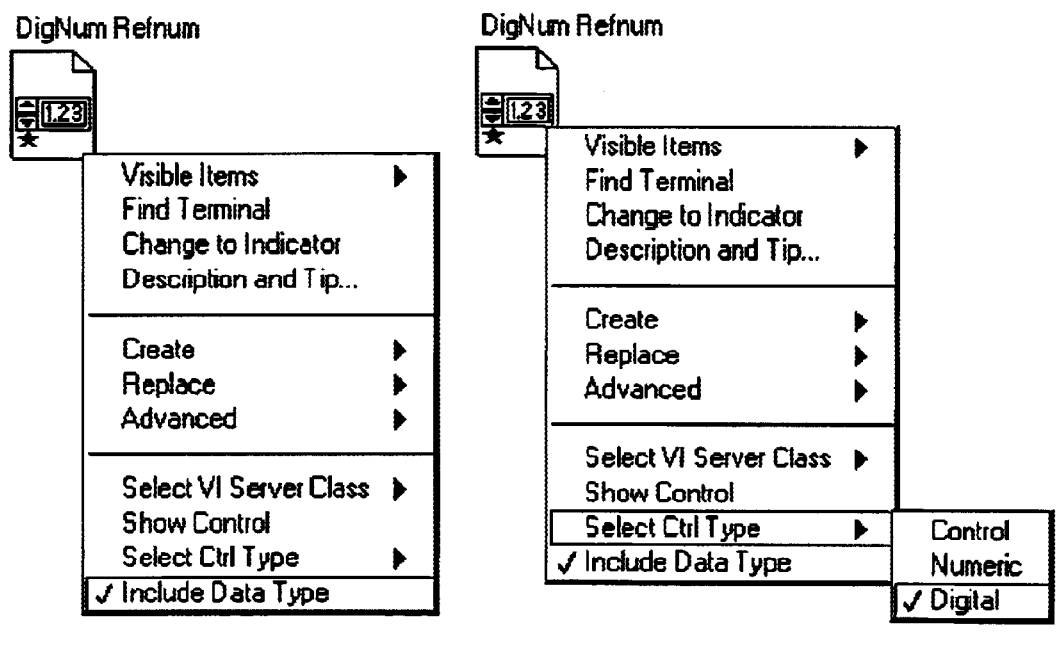
FIG. 21 illustrates changing the type information for a reference control.

As noted above, a generic reference control that accepts references to any element may be created. For example, if a subprogram sets or retrieves user interface properties that are common to all user interface elements, such a generic reference control may be appropriate. However, if the subprogram sets or retrieves the data value of a user interface element or sets or retrieves a property that is only applicable to certain user interface elements, more specific type criteria may be specified. For example, the user may select a reference control and invoke a pop-up menu such as shown in FIG. 21 in order to change the type information for the reference control. As noted above, in various embodiments, user interface elements may be classed or typed in any of various ways, and type information for user interface elements reference may be specified at various levels of granularity and in any of various ways.

Figure 22:
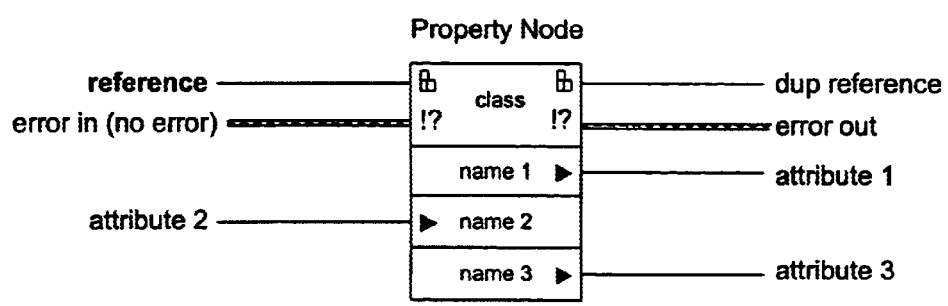
FIG. 22 illustrates in detail one embodiment of a property node.

FIG. 22—Configuring Property Nodes

FIG. 22 illustrates in detail one embodiment property node. In the FIG. 22 embodiment, the inputs and outputs of the property node are as follows:

"reference" is the reference associated with a user interface element or other object.

"error in" describes error conditions that exist prior to the execution of this node. The default input is "no error".

"dup reference" has the same value as reference.

"error out" describes error information. If "error in" indicates an error, "error out" comprises the same error information. Otherwise "error out" describes the error status that this node produces.

As described above, a property node may be used for setting or retrieving user interface properties or other data. To select a specific property, the user may display a list of properties, e.g., by displaying a pop-up menu for the node and selecting a "Properties" item. The list of available properties to select from may depend on the type of reference connected to the reference input. To retrieve property information the user may invoke a pop-up menu and select a "Change to Read" option. To set property information, the user may invoke a pop-up menu and select a "Change to Write" option. In the event that a property is read only, the "Change to Write" option may be disabled or omitted. A small direction arrow shown on the left of a property indicates that the property is being set. A small direction arrow shown on the right of a property indicates that the property is being retrieved.

In one embodiment, the user may set or retrieve multiple properties in a single node, such as shown in FIG. 8. If the user desires to add items to the node, the user may invoke a pop-up menu and select "Add Element" or may click and drag the node to expand the number of items in the node. When the node is executed, the properties may be set/retrieved in order from top to bottom. If an error occurs for one of the properties, execution may stop at that property and an error may be returned. In this case, no further properties may be handled. The "error out" output may comprise a string reporting which property caused the error. Alternatively, the user can popup on a property node and select an "Ignore Errors" option. This may put the property node in a new mode, in which any errors returned from any of the properties are ignored and all the propels are evaluated. If any of the properties returned an error, the "error out" output will indicate the property that returned the first error.

User Interface Element Reference Clusters

In various embodiments, a graphical programming system may support the use of parameter "clusters". For example, multiple inputs or outputs may be represented by a single wire that is connected to a node in a graphical program. In such an embodiment, a cluster of user interface element references may be created and passed as a unit in to or out from graphical program nodes. When such a cluster is passed to a property node, the property node may be operable to set and retrieve properties for each user interface element referenced in the cluster.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A memory medium comprising program instructions executable to:
   create a graphical program, wherein said creating the graphical program comprises creating a graphical diagram and a user interface, wherein the graphical diagram comprises a plurality of connected nodes which visually indicate functionality of the graphical program;
   wherein said creating the user interface comprises displaying a plurality of user interface elements;
   wherein said creating the graphical diagram comprises displaying a plurality of user interface nodes in the graphical diagram, wherein each of the user interface nodes is operable to programmatically set or retrieve a property of at least one user interface element in the user interface, wherein each of the user interface nodes is not connected to the at least one user interface element;
   wherein said creating the graphical diagram includes incorporating the plurality of user interface nodes into a subprogram of the graphical diagram.

2. The memory medium of claim 1, further comprising program instructions executable to:
   create at least one reference to the at least one user interface element; and
   provide the at least one reference to the subprogram, wherein at least one of the user interface nodes is operable to use the at least one reference in programmatically setting or retrieving a property of the at least one user interface element.

3. The memory medium of claim 1,
   wherein the graphical diagram is a graphical data flow diagram.

4. The memory medium of claim 1,
   wherein a particular user interface element is associated with a particular data type;
   wherein the memory medium further comprises program instructions executable to:
   connect a reference to the particular user interface element to the subprogram;
   perform type checking to ensure that the particular data type is a valid data type for the subprogram.

5. The memory medium of claim 1,
   wherein a particular user interface element is associated with a particular user interface element class;
   wherein the memory medium further comprises program instructions executable to:
   connect a reference to the particular user interface element to the subprogram;
   perform class checking to ensure that the user interface element class is a valid user interface element class for the subprogram.

6. The memory medium of claim 1,
   wherein the properties are user interface properties from the group consisting of:
   color, size, position, enabled.

7. The memory medium of claim 1,
   wherein the subprogram includes at least one node that is operable to programmatically set or retrieve a data value associated with a user interface element.

8. The memory medium of claim 1,
   wherein the user interface nodes are property nodes.

9. The memory medium of claim 1,
   wherein the subprogram has an associated front panel;
   wherein the memory medium further comprises program instructions executable to:
   include at least one reference control on the subprogram front panel;
   wherein the at least one reference control is operable to receive a reference to the at least one user interface element and pass the reference to the user interface nodes.

10. The memory medium of claim 2,
    wherein said creating the at least one reference to the at least one user interface element comprises creating at least one reference node in the graphical diagram;
    wherein the at least one reference node include a reference output;
    wherein the reference output references the at least one user interface element.

11. The memory medium of claim 2,
    wherein the graphical diagram includes a node representing the subprogram;
    wherein the memory medium further comprises program instructions executable to:
    display a node which represents the at least one reference;
    connect the reference node to the subprogram node.

12. The memory medium of claim 2, wherein the graphical diagram includes a node representing the subprogram;

wherein the memory medium further comprises program instructions executable to:

display a wire which represents the at least one reference;

connect the wire to the subprogram node.

13. The memory medium of claim 2, wherein the graphical diagram includes a node representing the subprogram.

14. The memory medium of claim 10, wherein said providing the at least one reference to the subprogram comprises connecting the reference output of the at least one reference node to a subprogram node of the subprogram.

15. A memory medium comprising program instructions executable to:

display a graphical program, wherein the graphical program comprises a graphical diagram and a user interface, wherein the user interface comprises a plurality of user interface elements, wherein the graphical diagram comprises a plurality of connected nodes which visually indicate functionality of the graphical program;

wherein the graphical diagram comprises a plurality of user interface nodes, wherein each of the user interface nodes is operable to programmatically set or retrieve a property of at least one user interface element in the user interface;

wherein the plurality of user interface nodes are incorporated into a subprogram of the graphical diagram, wherein each of the user interface nodes is not connected to the at least one user interface element;

wherein the graphical diagram includes a node representing the subprogram.

16. The method of claim 15, wherein the user interface element property is a property from the group consisting of:

color, size, position, enabled.

17. The method of claim 15, wherein the user interface nodes are property nodes.

18. The method of claim 15, wherein the graphical program is a program to implement an instrumentation, industrial automation, or test and measurement application.

19. A computer-implemented method for creating a graphical program, wherein the graphical program includes a graphical diagram portion and a user interface, the method comprising:

creating the user interface, wherein said creating comprises creating a plurality of user interface elements;

creating the graphical diagram portion of the graphical program, wherein the graphical diagram portion comprises a plurality of interconnected nodes which visually indicate functionality of the graphical program, wherein said creating the graphical diagram portion comprises:

displaying a plurality of user interface nodes in the graphical diagram, wherein each of the user interface nodes is operable to programmatically set or retrieve a user interface element property of a user interface element in the user interface, wherein each of the user interface nodes is not connected to the user interface element;

incorporating the plurality of user interface nodes into a subprogram of the graphical diagram portion.

20. The method of claim 19, further comprising:

creating one or more references to the user interface elements; and providing the one or more references to the subprogram, wherein the plurality of user interface nodes use the one or references in programmatically interacting with the user interface elements.

21. The method of claim 19, wherein the graphical diagram portion is a graphical data flow diagram.

22. The method of claim 19, wherein a particular user interface element is associated with a particular data type, the method further comprising:

connecting a reference to the particular user interface element to the subprogram;

performing type checking to ensure that the particular data type is a valid data type for the subprogram.

23. The method of claim 19, wherein a particular user interface element is associated with a particular user interface element class, the method further comprising:

connecting a reference to the particular user interface element to the subprogram;

performing class checking to ensure that the particular user interface element class is a valid user interface element class for the subprogram.

24. The method of claim 20, wherein said creating one or more references to the user interface elements comprises creating one or more reference nodes in the graphical diagram portion of the graphical program;

wherein the one or more reference nodes each include a reference output;

wherein the reference outputs of the one or more reference nodes reference the user interface elements.

25. The method of claim 20, wherein the graphical diagram portion includes a node representing the subprogram;

wherein the method further comprises:

displaying one or more reference nodes which represent the references to the user interface elements;

connecting the one or more reference nodes to the subprogram node.

26. The method of claims 24, wherein said providing the one or more references to the subprogram comprises connecting the reference outputs of the one or more reference nodes to a subprogram node of the subprogram.

27. A system for creating a graphical program, the system comprising:

a processor;

a memory coupled to the processor which stores a graphical program;

a user input device which receives user input;

wherein the graphical program comprises a graphical diagram and a user interface, wherein the user interface comprises a plurality of user interface elements, wherein the graphical diagram comprises a plurality of interconnected nodes which visually indicate functionality of the graphical program;

wherein the graphical diagram comprises a plurality of user interface nodes, wherein each of the user interface nodes is operable to programmatically set or retrieve a property of at least one user interface element in the user interface, wherein each of the user interface nodes is not connected to the at least one user interface element;

wherein the plurality of user interface nodes are incorporated into a subprogram of the graphical diagram;

wherein the graphical diagram includes a node representing the subprogram.

* * * * *